United States Patent [19]

Shafer et al.

[11] 4,045,644

[45] Aug. 30, 1977

[54] WELDING ELECTRODE AND METHOD OF MAKING

[75] Inventors: William M. Shafer; Anil V. Nadkarni, both of Baltimore, Md.

[73] Assignee: SCM Corporation, New York, N.Y.

[21] Appl. No.: 598,844

[22] Filed: July 24, 1975

[51] Int. Cl.² ............................................. B23K 11/30
[52] U.S. Cl. ..................................... 219/119; 72/352; 72/358; 72/377; 148/39; 29/624
[58] Field of Search ................. 219/119; 72/377, 352, 72/358; 148/39; 29/592, 624

[56] References Cited

U.S. PATENT DOCUMENTS

| 1,918,226 | 7/1933 | Gilbert | 219/119 |
| 1,998,108 | 4/1938 | Waisner | 72/377 UX |
| 2,066,314 | 1/1937 | Bartscherer | 72/377 |
| 2,754,571 | 7/1956 | Steffins | 72/377 |
| 3,250,109 | 5/1966 | Spyridakis | 72/377 |
| 3,340,718 | 9/1967 | Heisler | 219/119 |

Primary Examiner—E. A. Goldberg
Attorney, Agent, or Firm—Thomas M. Schmitz

[57] ABSTRACT

A welding electrode made of dispersion strengthened metal wherein the electrode tip is pressure formed or forged to reorientate and/or destroy the coaxial fiber structure and form a non-axial grain structure in the electrode tip portion. The electrode is produced in a method for pressure flowing a blank by applying axial pressure to pressure flow the blank transverse to the axially applied pressure whereby the overall strength of workpieces such as welding electrode rods is substantially increased.

6 Claims, 18 Drawing Figures

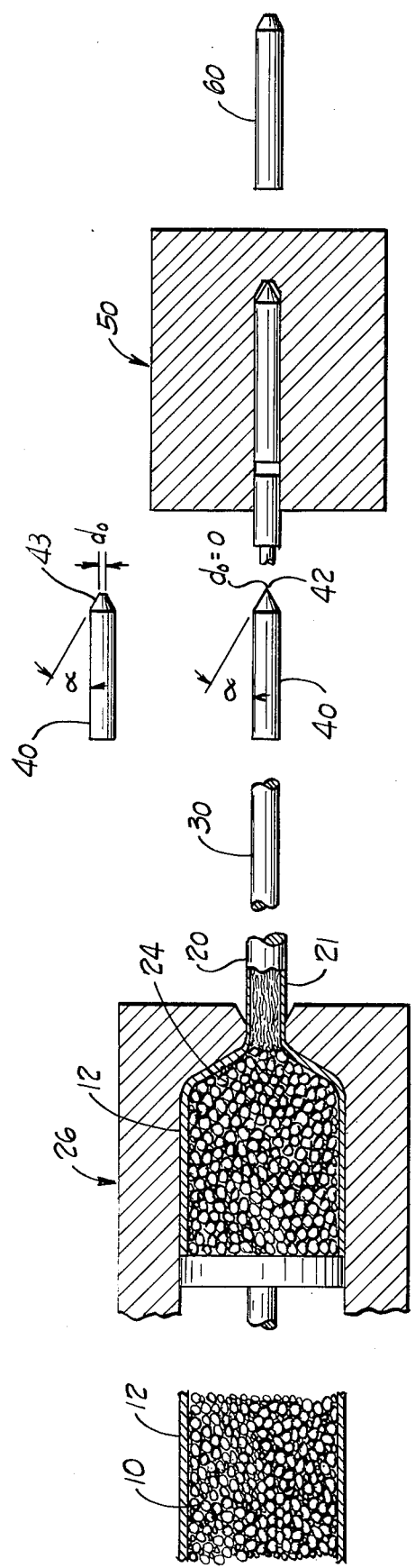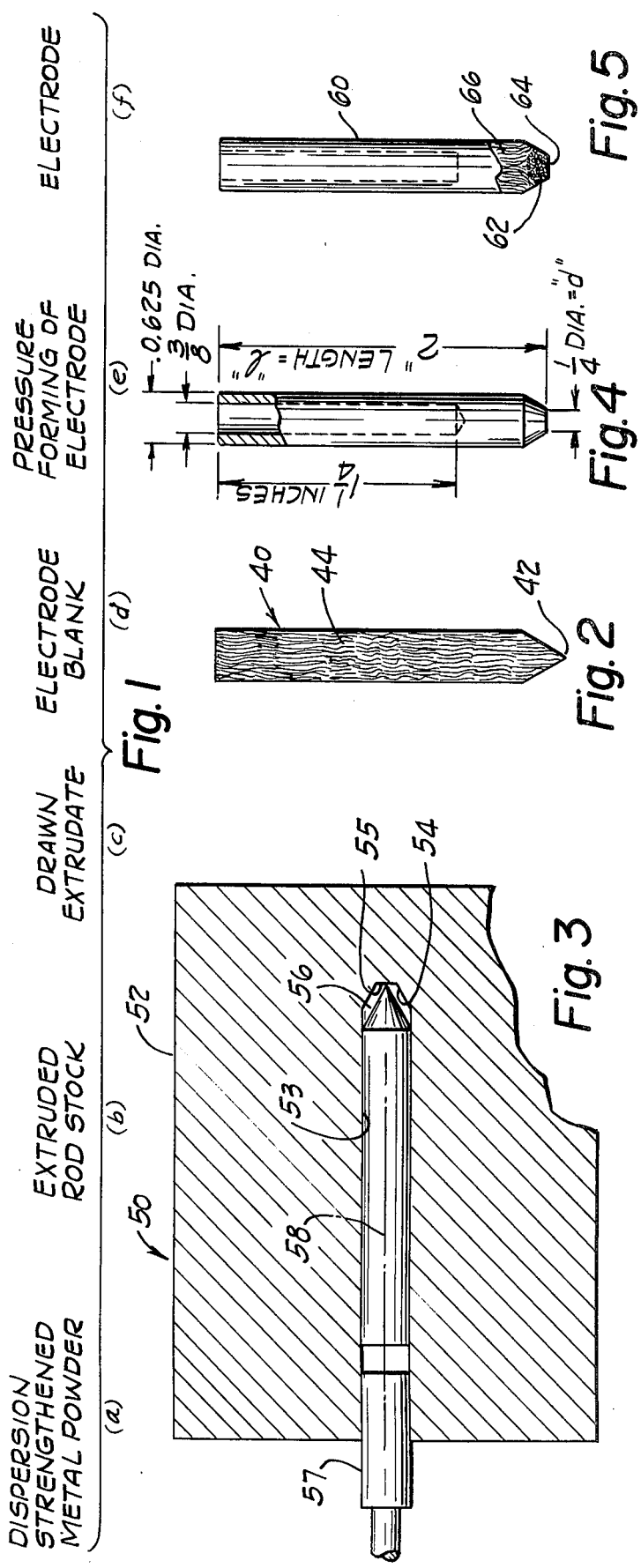

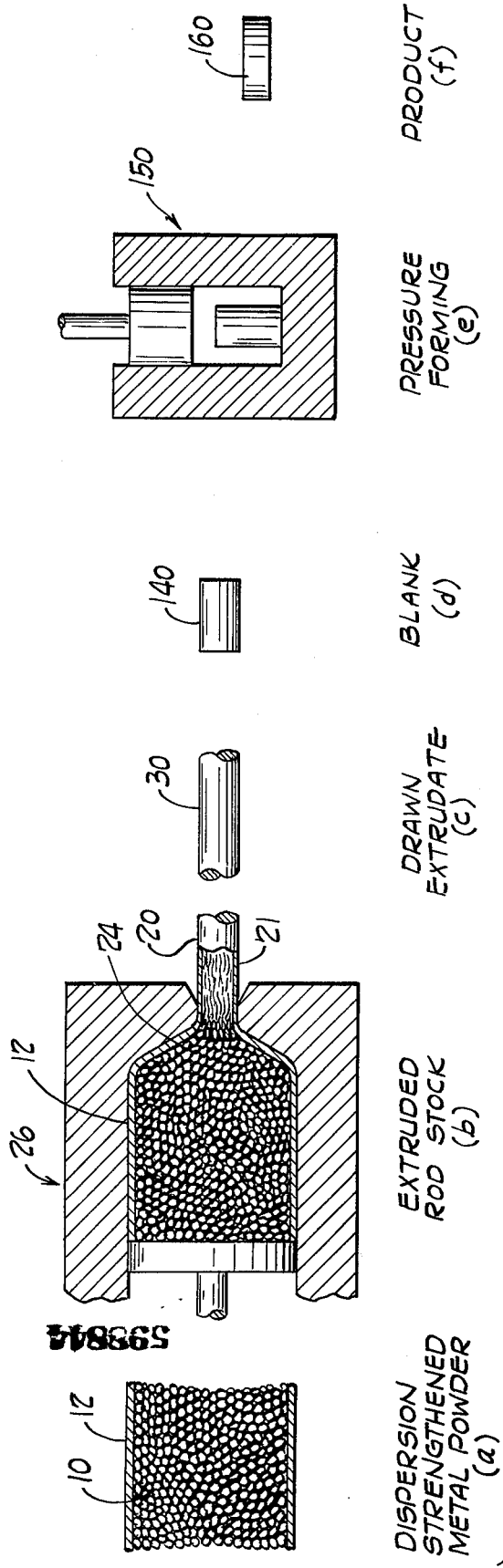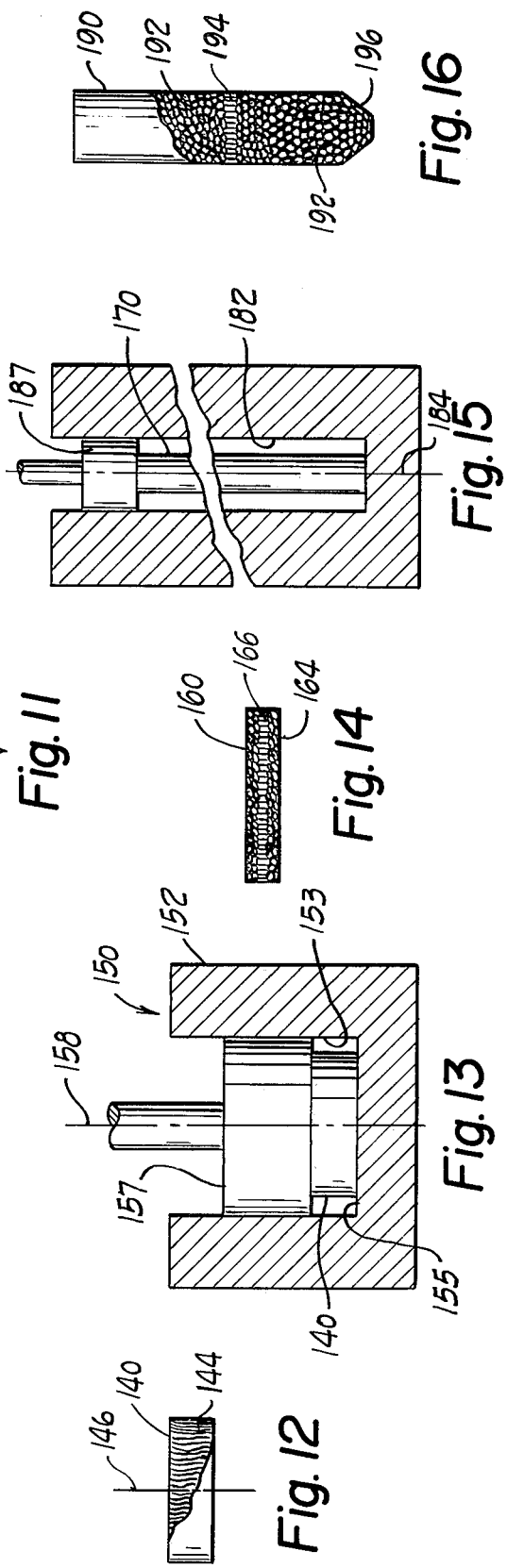

WELDING ELECTRODE AND METHOD OF MAKING

BACKGROUND OF THE INVENTION

This invention pertains to an electrode for resistance spot welding wherein the electrode is made of dispersion strengthened metal as well as a process for reorientating the coaxial grain structure of extruded dispersion strengthened metal parts to provide substantially improved products by pressure forming a blank to provide a non-axial grain structure in the product such as a welding electrode.

Dispersion-strengthened metal products, such as copper dispersion strengthened with aluminum oxide, have many commercial and industrial uses wherein high temperature strength properties and high electrical and/or thermal conductivities are desired or required in the finished product. Such commercial uses include many electrical uses such as for example, contact points, switches and switch gears, transistor assemblies, wires for solderless connections, wires for electrical motors, and many other uses requiring good electrical and thermal conductivities together with good strength and hardness at elevated temperatures.

Dispersion strengthening has been recognized in the past as a method for increasing strength and hardness of metal. A solid solution alloy comprising a relatively noble matrix metal having relatively low heat or free energy of oxide formation and a solute metal having relatively high negative heat or free energy of oxide formation can be dispersion strengthened by heating the alloy under oxidizing conditions to preferentially oxidize the solute metal. This technique of oxidizing the solute metal to a solute metal oxide is known in the art as in situ internal oxidation or more simply internal oxidation.

Several processes for internal oxidation have been suggested, such as disclosed in the Schreiner patent, U.S. Pat. No. 3,488,185; the McDonald patent, U.S. Pat. No. 3,552,954; the Grant patent, U.S. Pat. No. 3,179,515; as well as commonly assigned U.S. Pat. No. 3,779,714 and incorporated herein by reference. U.S. Pat. No. 3,779,714 provides an improved alloy-oxidant mixture wherein the oxidant includes an oxide which releases oxygen to oxidize the solute metal of the alloy. The oxidant further includes a hard refractory oxide which is particularly adapted to assimilate the oxidant residue into the dispersion-strengthened metal and becomes dispersion strengthened during thermal coalescence by the hard, refractory metal oxide. The oxidant residue formed during internal oxidation is not required to be removed from the dispersion-strengthened metal but rather is dispersion strengthened by the hard, refractory metal oxide during coalescence to form an integral part of the dispersion-strengthened metal stock. A further improvement is set forth in allowed copending and commonly assigned application identified as Ser. No. 384,028 filed July 20, 1973 which provides improved dispersion-strengthened metals produced by internal oxidation by first recrystallizing the alloy powder prior to internal oxidation to increase the grain size of the alloy to a grain size at least as large as Grain Size No. 6 as measured by ASTM Test No. E-112.

Dispersion strengthened metals are often referred to as super alloys wherein hard stock is produced by subjecting the dispersion strengthened metal powders to consolidation under heat and pressure. The most common method of consolidation is extrusion at temperatures at least above about 1000° F, usually above 1400° F and preferably about 1700° F for dispersion strengthened copper. Extrusion for example, can be by a ram-type extrusion press wherein the extrudate emerges in cylindrical or other desired bar stock. The cylindrical extrudate is then often cold drawn to further reduce the cross-section of the rod. Extrusion, however, produces an anisotropic axial grain structure in the direction of extrusion which tends to produce lower hot strength in the transverse direction although maintaining good stength in the axial direction. The lower hot strength in the transverse direction has been found to contribute to premature mechanical failure of a resistance welding electrode wherein the electrode tip tends to mushroom and crack from repetitive use of the electrode.

Accordingly, it now has been found that dispersion strengthened metal electrodes can be substantially improved by reorientating and/or destroying the anisotropic grain structure in the tip portion of the electrode by causing the tip portion to flow under pressure and produce a localized, fine substantially equiaxed or isotropic grain structure in the electrode tip. The equiaxed or isotropic grain structure in the electrode tip overcomes the deficiencies inherently formed during the consolidating extrusion step and drawing step which produce an axial anisotropic fibrous grain structure.

A primary object of this invention is to reorientate and/or destroy the fibrous coaxial grain structure in extruded dispersion strengthened metal stock by applying axial pressure to an electrode blank to cause flow transverse to the axis whereby an equiaxed grain structure is formed in the electrode tip.

A further object is to provide a process for increasing the overall strength in load bearing portions of workpieces such as welding electrodes by pressure forming and causing flow transverse to the coaxial fiber structure to destroy and/or reorientate the grain structure into a non-axial grain structure such as isotropic or equiaxed grain structures.

These and other advantages will become more apparent by referring to the drawings and the detailed description of the invention.

SUMMARY OF THE INVENTION

A resistance welding electrode is produced from dispersion strengthened metal powder consolidated under pressure to produce extruded metal stock which ordinarily is then cold drawn. Electrode blanks cut from the extrudate are reshaped under pressure or forged to pressure flow the material in the tip portion and reorientate the grain structure into a non-axial direction and preferably destroy at least a portion of the fibrous grain structure to produce an isotropic or equiaxed grain structure in the electrode tip. The method of producing the improved product such as a resistance welding electrode includes the step of consolidating dispersion strengthened metal powder into extruded metal stock followed by drawing and forming a suitable blank. The intended load bearing portion of the blank is pressure flowed to reorientate and/or destroy the fibrous grain structure of the electrode tip into a non-axial grain structure. Preferably, the workpiece such as a welding electrode has an isotropic or equiaxed grain structure in the tip portion of the electrode.

In The Drawings:

FIG. 1 is a schematic flow diagram illustrating this invention;

FIG. 2 is a section view depicting co-axial fibrous grain structure of an enlarged front elevation view of the electrode blank shown in FIG. 1 (d);

FIG. 3 is an enlarged sectional front elevation view of the forming die shown in FIG. 1 (e);

FIG. 4 illustrates a standard welding electrode;

FIG. 5 is the resistance welding electrode cap of this invention indicating comparable to FIG. 2 reorientation of the grain structure in accordance with this invention;

FIG. 9 (b) is a photomicrograph enlarged 50 times showing the isotropic grain structure in the electrode tip after cold forging in accordance with this invention;

Figure 10A:
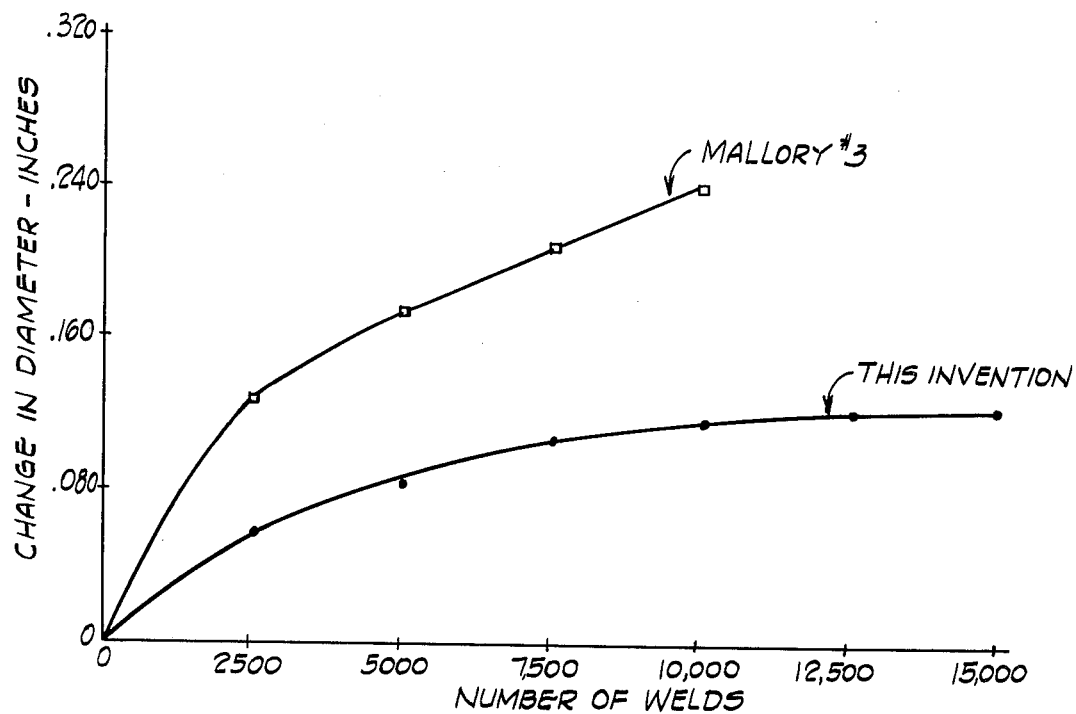
Figure 10B:
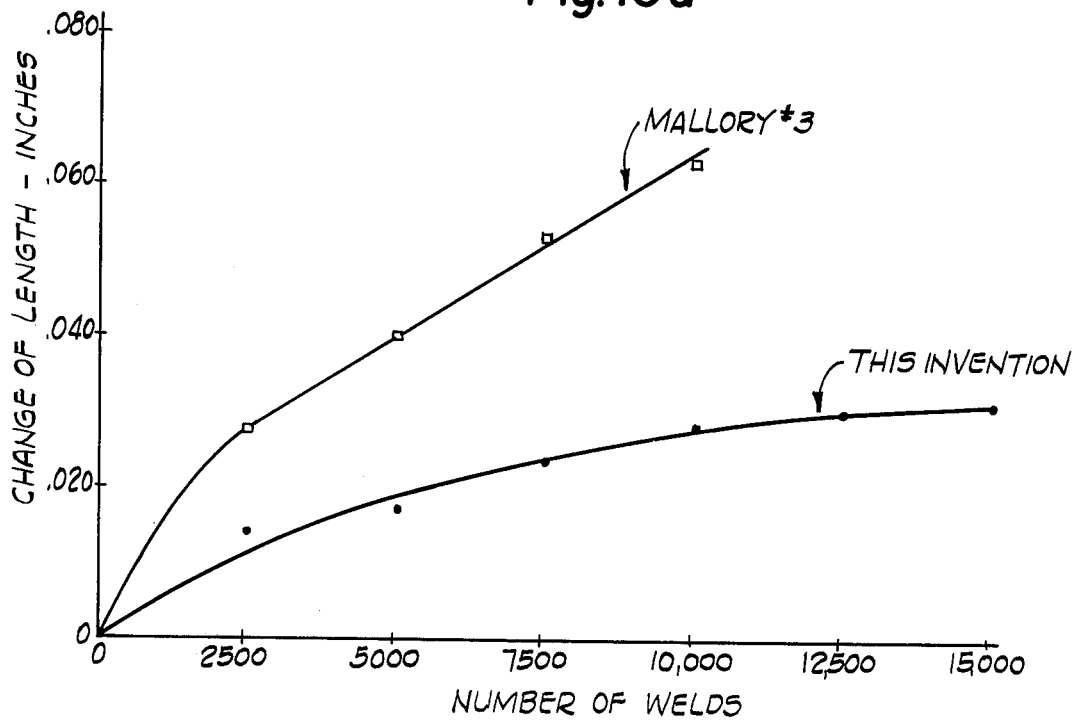

FIG. 10 (a) and (b) shows a graph of comparative test results of welding electrodes of this invention compared to electrodes made from Standard Mallory 3 material.

FIG. 11 is a schematic flow diagram similar to FIG. 1 showing post-forming of a blank in an oversize die;

FIG. 12 is an enlarged view of FIG. 11 (d) rotated 90° and depicting in partial section axial fibrous grain structure;

FIG. 13 is an enlarged front elevation of FIG. 11 (e);

FIG. 14 is the resulting part post-formed in FIG. 13 in accordance with invention;

FIG. 15 is a further embodiment showing an elongated rod being post formed; and

FIG. 16 is the resulting elongated metal part post formed in FIG. 15.

DETAILED DESCRIPTION OF THE INVENTION

Referring now to the drawings wherein like characters indicate like parts, shown in FIG. 1 is a schematic diagram of forming dispersion strengthened metal powder 10 into extruded metal stock 20 followed by cold drawing the extrudate 20 into drawn extrudate 30 which can be cut and machined to form a blank 40. The blank 40 is pressure formed by means 50 in accordance with this invention to form an electrode 60 having a reorientated grain structure in the electrode tip portion.

The dispersion strengthened metal powder 10 can be produced by internal oxidation such as proposed in U.S. Pat. Nos. 3,488,185; 3,552,954; and 3,179,515 or other suitable method for dispersion strengthening metals. Preferably the dispersion strengthened metal is produced by internal oxidation in accordance with commonly assigned U.S. Pat. No. 3,779,714 and allowed application Ser. No. 384,028 filed July 30, 1973. The dispersion strengthened metal 10 is contained within a metal container 12 and can be consolidated as indicated in FIG. 1 (b) by heating the dispersion strengthened metal powder 10 within the container 12 to above about 1400° F, and preferably to about 1700° F. The heated powder 24 is extruded under pressure such as in ram-type extrusion press 26 to form solid extrudate 20 of metallurgically bonded dispersion strengthened metal having a very thin cladding 21 due to extrusion of the container 12. Ordinarily the extrudate 20 is circular rod which is then cold drawn, cut, and then machined to form an electrode blank 40 with a taper point 42. The electrode blank 40 can have a conical tip 42, or terminate in a frustum 43 as shown alternatively in FIG. 1 d. The blank 40 can be a right cylindrical blank cold formed to welding electrode.

Figure 7:
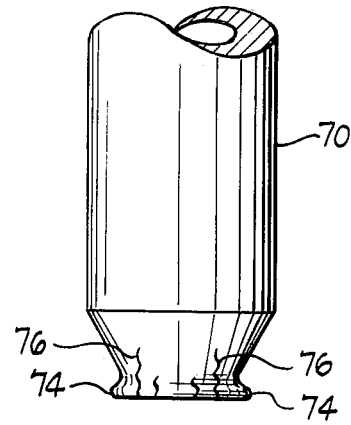
FIG. 7 is a conventional welding electrode produced from dispersion strengthened metal after testing.

In FIG. 2, the formed electrode blank 40 is illustrated in vertical partial section depicting internally the axially oriented fibers 44 which give rise to an anisotropic grain structure typically resulting from extruding and cold drawing the dispersion strengthened metal. The fibrous grain structure 44 provides considerable physical strength in the fiber direction but has been found to cause premature failure of various workpieces such as conventional welding electrodes 70 after extensively used as illustrated in FIG. 7. As indicated in FIG. 7, the welding tip 72 of a conventional electrode 70 has a mushroomed flat 74 as well as linear cracks 76 which develop after long use and are both attributed to the inherent transverse weakness of co-axial fibers of the anisotropic grain structures 44.

In accordance with this invention, deficiencies in electrodes and other workpieces made from dispersion strengthened metal can be effectively overcome by post-forming the electrode blank 40 under substantial pressure by means 50 as more particularly shown in FIG. 3. The pressure forming means 50 includes a forming die member 52 with an elongated and preferably cylindrical cavity 53 terminating in a truncated conical tip portion 54 having a flat tip base 55 in accordance with the size and shape of the electrode to be produced. Although the tip 54 is shown as a flat base 55, the base can be arcuate or conical depending on the welding tip configuration desired. The elongated cavity 53 can provide a sleeve fit with the electrode blank 40 but also can be slightly oversize as indicated in FIG. 3. The conical wall 54 is adapted to provide spacing between the conical cavity walls 54 and the conical portion of the preformed electrode blank 40 wherein the oversize cavity is at least about double the volume of the preformed electrode tip portion. The spacing 56 is at least about 1/16 inch and preferably at least about ⅛ inch spacing disposed laterally between blank tip portion and the conical cavity wall 54. The electrode blank 40 can have the sharp tip 42 removed and in this instance the area of the base 55 of the die cavity 53 is at least about double the cross-sectional area of the electrode blank tip 43 and preferably four times the area. Similarly, a cylindrical blank will only partially enter the tip cavity 54 and not engage the base 55 thereby permitting the cylindrical slug to pressure flow into the cavity. The die 52 is fitted with an upper die punch 57 which engages the upper portion of the electrode blank 40 to exert vertical axial pressure on the electrode blank 40 and cause the tip portion 42, 43 of the electrode blank 40 to expand laterally outwardly until engaging the tapered truncated walls 54 of the die cavity 53. Post-forming the electrode blank 40 by pressure forming in an axial direction 58 thereof effectively reorientates or destroys the anisotropic grain structure 44 in the tip portion 42, 43 of the electrode blank 40. FIG. 5 indicates the resulting electrode 60 formed in accordance with this invention and having an equiaxed or isotropic grain structure 62 in the electrode tip 64 whereas the remainder of the grain structure can remain the anisotropic co-axial fibrous grain structure 66 although the entire electrode 60 can be substantially equiaxed by sufficient axial pressure being applied to a properly shaped electrode blank in a suitably designed oversize die.

Figure 6:
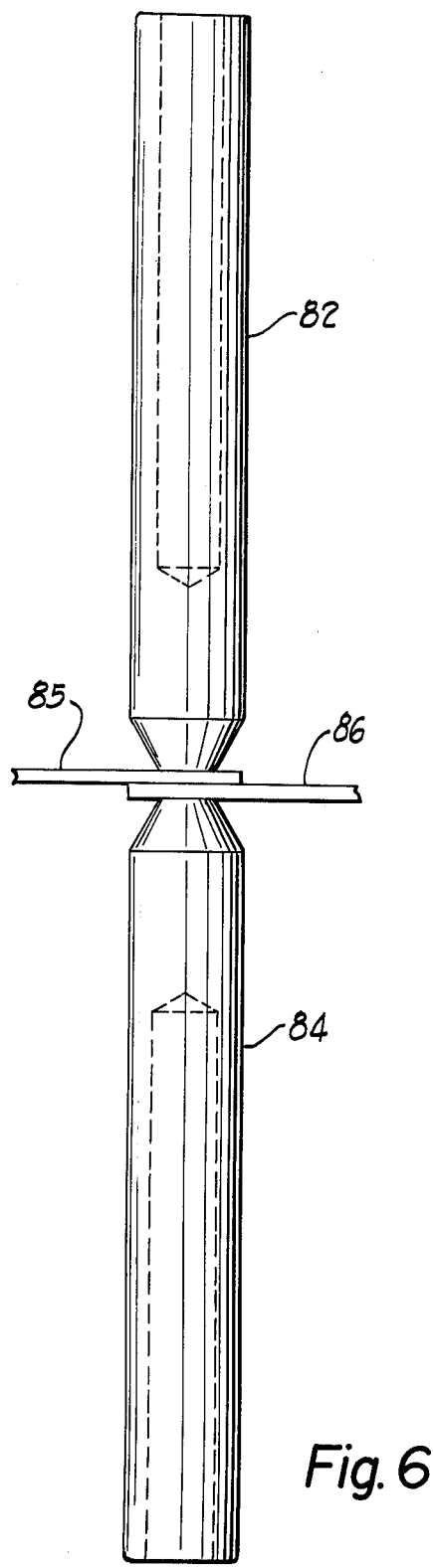
FIG. 6 is the test method for comparative testing of the electrodes.

The cold formed electrode 60 of this invention was comparatively tested with conventional machined electrodes 70 by conventional spot welding testing methods as indicated in FIG. 6. All of the test electrodes were of the same configuration as illustrated in FIG. 4. The electrode tip had a 60° conical taper and the tip flat was circular having ¼ inch diameter $d$. The interior hole of the test electrode was for water cooling and the end opposite the electrode tip had a Morse taper. The overall length $l$ of the electrode was 2 inches. The test consisted of two test electrodes welding lapped sheet steel. The upper electrode 82 was a movable electrode whereas the lower electrode 84 was stationary. The lapped steel 85,86 to be welded was SAE 1010, ¼ hard cold rolled steel, uncoated and being 0.050 inch thick. The test conditions were as follows:

| | |
|---|---|
| Weld force | 650 pounds |
| Weld time | 30 cycles |
| Squeeze time | 8 cycles |
| Hold time | 9 cycles |
| Welding current | 8300 amps ± 200 amps |
| Welding speed | 40 welds/minute |
| Water flow rate | 1.0 gal./minute/electrode |
| Weld diameter | 0.18 to 0.21 inch |
| Weld tension-shear strength | 1700 pounds ± 300 pounds |

The welder was set up for 650 pounds load and the current was adjusted for the duty cycle to develop the specified weld suggested size and specified weld strength. Welding was continued on the same test panels for 500 continuous welds whereupon the electrodes were removed and measured for length $l$ and the face diameter $d$ of the test electrodes and the measurements were recorded. The electrodes 82 and 84 were then returned to their respective positions and test continued again for another 500 weld cycle. The procedure was continued for five cycles until at least 2500 welds were produced. A series of electrodes were comparatively tested and the test results are set forth in Table 1 in Example 1.

EXAMPLE 1

A. Electrodes were fabricated from extruded and cold drawn dispersion strengthened copper containing 0.7% by weight $Al_2O_3$. The electrodes had an axial fibrous grain structure. The electrode tip was machined to form a truncated welding tip and subsequently tested with the results indicated in Table 1 hereinafter.

B. Electrodes were cut from the same extruded and cold drawn dispersion strengthened metal rod in part (A) except that the electrodes were cold forged with axially applied pressure to pressure flow the tip into a truncated tip having an equiaxed grain structure. The electrode blank used in this test had $\alpha=20°$ and $d_o=0$ inch with reference to FIG. 1 $d$.

C. Standard RWMA Class 2 material (Mallory 3) was cut into blank electrodes stock which was machined to produce a truncated welding tip. The material composition was an alloy of about 99% copper and 1% chromium.

TABLE 1

| Number of Welds | Upper Electrode Length "l" in inches | | | Upper Electrode Diameter "d" in inches | | |
|---|---|---|---|---|---|---|
| | (A) | (B) | (C) | (A) | (B) | (C) |
| 0 | 1.995 | 1.997 | 1.992 | 0.242 | 0.249 | 0.250 |
| 500 | 1.984 | 1.990 | 1.982 | 0.328 | 0.290 | 0.321 |
| 1000 | 1.974 | 1.988 | 1.972 | 0.351 | 0.295 | 0.358 |
| 1500 | 1.968 | 1.987 | 1.966 | 0.369 | 0.300 | 0.376 |

TABLE 1-continued

| Number of Welds | Upper Electrode Length "l" in inches | | | Upper Electrode Diameter "d" in inches | | |
|---|---|---|---|---|---|---|
| | (A) | (B) | (C) | (A) | (B) | (C) |
| 2000 | 1.966 | 1.985 | 1.964 | 0.380 | 0.302 | 0.388 |
| 2500 | 1.964 | 1.983 | 1.958 | 0.388 | 0.306 | 0.400 |

Changes in length and diameter which are indicative of electrode wear can be determined from the actual dimensions reported in Table 1. Referring to electrodes A, B, and C:

A. The standard dispersion strengthened electrode had a coaxial fibrous grain structure and performed as well as RWMA Class 2 material (C) wherein electrode (A) had a $\Delta l$ of 0.031 inch. However, (A) exhibited small linear axially disposed cracks and circumferential mushrooming of the electrode tip.

Figure 8:
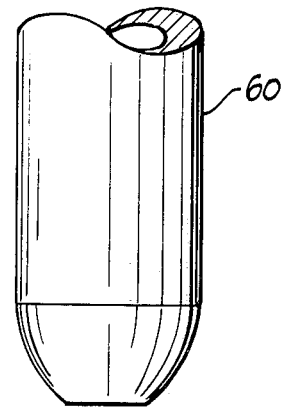
FIG. 8 is a welding electrode having substantially equiaxed grain structure obtained in accordance with this invention after being comparatively tested with the electrode in FIG. 7.
Figure 9A:
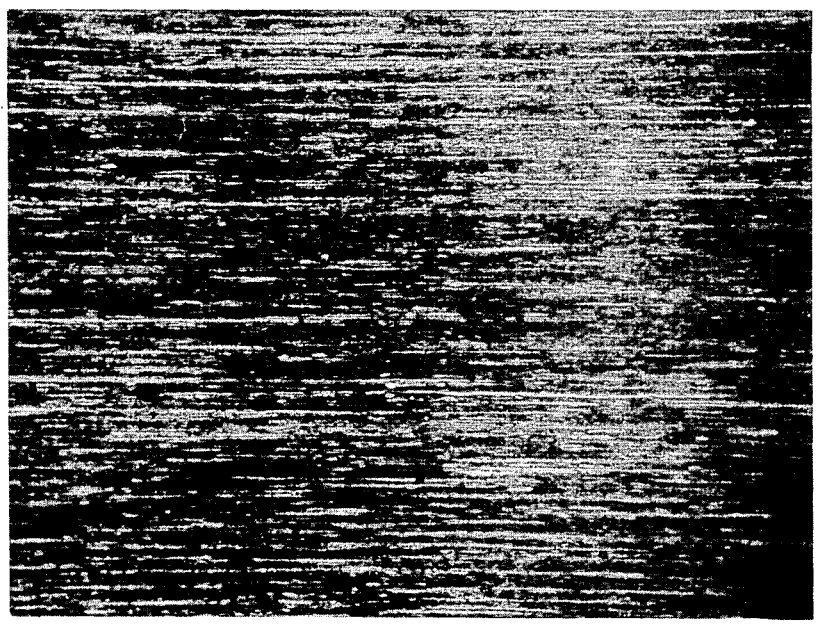
FIG. 9 (a) is a photomicrograph enlarged 50 times showing co-axial fibrous grain structure.
Figure 9B:
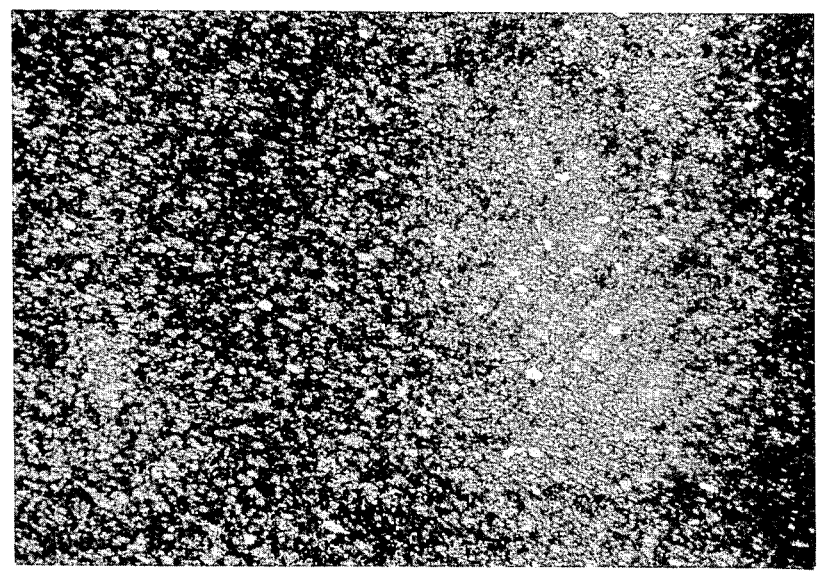

B. The equiaxed electrode of this invention had an isotropic grain structure and showed substantially improved performance over the conventional electrode (A) having an anisotropic fibrous grain structure. This electrode (B) did not exhibit cracking nor mushrooming although the truncated walls of the electrode tip expanded slightly as indicated in FIG. 8.

C. The electrode made of RWMA Class 2 material was used as a standard. After 2500 welds, the electrode tip decreased in length by 0.034 inch and exhibited an enlarged welding tip portion although no cracks were apparent.

EXAMPLE 2

The RWMA Class 2 electrode of Example 1 (C) was comparatively tested against (D) electrodes made of the same material which were cold forged in an axial direction from a blank having an $\alpha=20°$ and a $d_o=0$ inch. The blank was cold forged as shown in FIG. 3. Measurements of the upper electrodes are reported in Table 2 following.

Table 2

| Number of Welds | Length "l" inches | | Diameter "d" inches | |
|---|---|---|---|---|
| | (C) | (D) | (C) | (D) |
| 0 | 1.992 | 2.001 | 0.250 | 0.262 |
| 500 | 1.982 | 1.988 | 0.321 | 0.345 |
| 1000 | 1.972 | 1.980 | 0.358 | 0.375 |
| 1500 | 1.966 | 1.976 | 0.376 | 0.393 |
| 2000 | 1.964 | 1.973 | 0.388 | 0.410 |
| 2500 | 1.958 | 1.968 | 0.400 | 0.421 |

The foregoing comparative testing of standard RWMA Class 2 (Mallory 3) (C) was axially post-formed cold forged RWMA Class 2 material (Mallory 3) (D) indicates that the two electrodes (C) and (D) performed equivalently with change in length of 0.034 inch and 0.033 inch respectively after 2500 welds. Hence, cold forging this material in axial direction does not improve the RWMA Class 2 electrodes (C) and (D) and indicates that equiaxing the fibrous grain structure of dispersion strengthened materials is a unique improvement to extruded dispersion-strengthened materials.

EXAMPLE 3

Electrodes made in accordance with this invention and Example 1 (B) were comparatively tested with electrodes (E) made by machining RWMA Class 2 Material (Mallory 3). The test was for wearability beyond 2500 welds. The length and diameter measurements of the upper electrodes are reported in Table 3 following:

TABLE 3

| Number of Welds | Length "l" inches | | Diameter "d" inches | |
|---|---|---|---|---|
| | (B) | (E) | (B) | (E) |
| 0 | 1.997 | 2.000 | 0.249 | 0.254 |
| 2,500 | 1.983 | 1.972 | 0.306 | 0.381 |
| 5,000 | 1.980 | 1.960 | 0.332 | 0.428 |
| 7,500 | 1.974 | 1.947 | 0.356 | 0.462 |
| 10,000 | 1.969 | 1.937 | 0.364 | 0.493 |
| 12,500 | 1.967 | — | 0.371 | — |
| 15,000 | 1.966 | — | 0.372 | — |

Table 3 and FIG. 10 show the clear superiority of electrode (B) over electrode (E). Electrode (E) had a change in length of 0.028 inch after 2500 welds whereas it took 10,000 welds to produce the same length change in electrode (B). Similarly, the change in diameter of electrode (E) after 2500 welds was greater than that in electrode (B) after 15,000 welds. More importantly, the wear of electrode (B) levels off steadily with almost no wear between 12,500 and 15,000 welds, whereas the wear of electrode (E) is almost linear after 2500 welds. Thus, the decreasing wear rate of electrode (B) makes it far superior to the constant wear rate of electrode (E). The changes in length and diameter of the electrodes (B) and (E) are plotted in FIG. 10.

TABLE 4

| No. of Welds | Length "l" inches | | | Diameter "d" inches | | |
|---|---|---|---|---|---|---|
| | (F) | (G) | Mallory 3 | (F) | (G) | Mallory 3 |
| 0 | 2.008 | 2.001 | 2.001 | 0.262 | .246 | 0.262 |
| 500 | 2.004 | — | 1.988 | 0.286 | — | 0.345 |
| 1000 | 2.001 | 1.991 | 1.980 | 0.296 | .292 | 0.375 |
| 1500 | 1.999 | 1.989 | 1.976 | 0.298 | .301 | 0.393 |
| 2000 | 1.997 | 1.989 | 1.973 | 0.306 | .304 | 0.410 |
| 2500 | 1.995 | 1.988 | 1.968 | 0.307 | .310 | 0.421 |

F. Electrodes were cold forged in accordance with this invention from an extruded and cold drawn dispersion strengthened blank having a machined tip with $'\alpha' = 30°$ and $'d_o = 0$.

G. Electrodes were cold forged in accordance with this invention from an extruded and cold drawn dispersion strengthened blank having a machined tip with $'\alpha' = 15°$ and $'d_o = 0$.

Mallory 3 electrodes were cold forged from an electrode blank having $'\alpha' = 20°$ and $d_o = 0$ and were the same as those labeled D in Example 2 hereinbefore.

Table 4 indicates that various dispersion strengthened copper electrodes having equiaxed grain structure at the electrode tip in accordance with this invention show substantial improvements in wear characteristics over both machined and cold formed Mallory 3 electrodes.

EXAMPLE 5

A set of equiaxed dispersion strengthened copper electrodes was made in accordance with this invention using extruded and cold drawn dispersion strengthened copper electrode blanks having alpha = 20° and $d_o = \frac{1}{8}$ inch. The diameter $d$ and length $l$ are presented in Table 5 which also contains for comparison data of electrodes B presented hereinbefore in Table 1 of Example 1.

TABLE 5

| No. of Welds | Length "l" inches | | Diameter "d" inches | |
|---|---|---|---|---|
| | (H) | (B) | (H) | (B) |
| 0 | 1.999 | 1.997 | 0.248 | 0.249 |
| 500 | 1.997 | 1.990 | 0.287 | 0.290 |
| 1000 | 1.995 | 1.988 | 0.295 | 0.295 |

TABLE 5-continued

| No. of Welds | Length "l" inches | | Diameter "d" inches | |
|---|---|---|---|---|
| 1500 | 1.993 | 1.987 | 0.300 | 0.300 |
| 2000 | 1.991 | 1.985 | 0.307 | 0.302 |
| 2500 | 1.987 | 1.983 | 0.318 | 0.306 |

Table 5 indicates substantial improvement in wear characteristics by forging an electrode blank having a truncated conical tip instead of one with a sharp point. A significant advantage is achieved by producing an electrode blank by cold forming a right cylindrical slug blank instead of machining the blank. The diameter $d_o = \frac{1}{8}$ inch of the frustum is further helpful in not only being able to cold form the electrode blank but also in subsequently ejecting the blank from the cold forming die.

The foregoing examples illustrate the merits of this invention and particularly show that post-formed electrode tips having equiaxed grain structure substantially improve the useful welding life of resistance welding electrodes produced from extruded dispersion-strengthened materials.

Referring now to FIGS. 11–16 inclusive wherein like characters indicate like parts, shown in FIG. 11 is a schematic diagram similar to FIG. 1 except that the blank 140 is post-formed in an oversized pressure forming means 150 to form substantially complete equiaxed grain structure throughout the post formed metal part 160. The blank 140 can be short or elongated but is post-formed in a laterally oversize cavity so that the complete blank 140 flows transversely with respect to the axially applied pressure.

In FIG. 12, the short blank 140 is illustrated in vertical partial section indicating internally the axially orientated fibers 144 of the grain structure which is an anisotropic grain structure typically resulting from extruding and cold drawing dispersion strengthened metal. The fibrous grain structure 144 is coaxial with axis 146 and provides considerable physical strength in the axial direction but has been found to cause premature failure due to excessive forces applied transversely to the axis 146. The short blank 140 can be post formed into welding wheels for seam welding. Welding wheels engage the steel to be welded with considerable pressure which tends to cause premature failure in the circumferential periphery of conventional wheels as well as develop axial fissures or interfiber cracking. Similarly, elongated circuit breaker rods encounter considerable transverse impact forces in use which tends to cause premature failure.

In accordance with this invention, deficiencies in metal parts made from dispersion strengthened metal can be effectively overcome by post-forming the blank 140 under substantial axial pressure by means 150 as more particularly shown in FIG. 13. The pressure forming means 150 includes a forming die member 152 with a laterally oversize cylindrical cavity 153 which terminates in a flat base 155. The cavity 153 is laterally or transversely oversized of the blank 140 and has a cross-sectional area about double the cross-sectional area of the blank 140, or comparably, the area of a square or rectangular cavity base can be about double the transverse dimensions of the blank 140. Thus, for example, a 6 inch diameter welding wheel can be produced from a 4 inch diameter blank. The die 152 is fitted with an upper die punch 157 which engages the upper portion of the preformed blank 140 to exert vertical axial pressure thereon and cause the preformed blank 140 to expand laterally outwardly until engaging the cylindrical walls of the die cavity 153. Post-forming the blank 140 by pressure forming in the axial direction 158 thereof effectively reorientate and/or destroys the anisotropic grain structure 144 in the blank 140 and preferably produces a grain structure that is substantially equiaxed or isotropic throughout the finished part. FIG. 4 indicates the resulting equiaxed workpiece 160 being a welding wheel formed in accordance with this invention and having an equiaxed grain structure 164 substantially throughout the part 160 although a very minor portion of axial fibers 166 can remain midway in the pressure formed part 160.

A further embodiment of this invention is shown in FIGS. 15 and 16 wherein the blank 140 cut from drawn extrudate 30 is shown to be an elongated cylindrical blank 170 having a coaxial, anisotropic fibrous grain structure, as illustrated in FIGS. 2 and 12. The elongated blank 170 can be post-formed by cold forging the blank 170 in a die member 180 having an oversized cylindrical cavity defined by walls 182. The die 180 is equipped with an upper punch 187 adapted to axially engage the upper portion of the blank 170 and apply axial pressure on the blank 170 in the axial direction 184. The blank 170 is pressure flowed in a direction transverse to the axis 184 by cold forging or applying axial pressure to produce a workpiece or finished part 190 preferably having substantially an isotropic or equiaxed grain structure 192 substantially throughout the part 190 although a very minor middle portion of the part 190 can remain coaxial fibers 194. An elongated ½ inch diameter blank 170, for example, can be cold forged under axial pressure to cause transverse cold flow and produce a ⅝ inch diameter equiaxed metal part 190 with ⅝ inch diameter die cavity 182. The cylindrical equiaxed metal part 190 is particularly suitable for resistance electrodes welding, or large electrical circuit breakers, or similar elongated parts.

In FIG. 16, for example, the cylindrical part 170 has been pressure formed in accordance with this invention to produce a substantially equiaxed welding electrode 190 wherein the welding tip 196 can be machined or formed in suitable die in the pressure forming process.

In practice, the resistance welding electrodes and other dispersion strengthened metal parts such as electrodes, electrical connectors, circuit breakers and like parts can be substantially improved in accordance with the process of this invention by subjecting a blank to axial pressure to pressure flow at least the load bearing portion of workpiece part. The pressure flowed portion of the workpiece flows transversely to the axially applied pressure to reorientate and/or destroy the axial grain structure. The axially orientated grain structure can be reorientated transversely in addition to being at least partially destroyed to form random non-fibrous structures such as an isotropic or equiaxed grain structure. Preferably, the axial fibrous grain structure in the pressure formed portion of the workpiece is substantially destroyed to provide substantially an isotropic grain structure in the load bearing portion such as the tip portion of a welding electrode.

Thus, in accordance with the process of this invention, dispersion strengthened metal is consolidated under heat and extruded in an axial direction whereupon the extrudate is ordinarily cold drawn. A blank is cut from the drawn extrudate and cold forged in an oversize cavity by axially applied pressure to reorientate and/or destroy the co-axial fibrous grain structure in at least the load bearing portion of the workpiece. Substantially improved strength is achieved in dispersion strengthened metal parts produced in load bearing parts wherein hot strength is a performance factor.

The foregoing is descriptive and illustrative of preferred embodiments of this invention but not intented to be limited except as defined by the appended claims.

We claim:

1. A dispersion strengthened metal resistance welding electrode produced from consolidated dispersion strengthened metal extruded in an axial direction and having co-axial, anisotropic fibrous grain structure, the improvement comprising:

said resistance welding electrode having a welding tip portion wherein the grain structure is reorientated into a nonfibrous, isotropic grain structure formed by pressure-flowing said tip portion transversely to said axis to form the nonfibrous isotropic grain structure in said welding tip.

2. In a process for forming dispersion strengthened metal welding electrodes from consolidated dispersion strengthened metal extruded in an axial direction and having a co-axial anisotropic fibrous grain structure, the improvement comprising:

providing a workpiece blank from said extruded metal;

applying axial pressure to said workpiece blank to pressure flow at least a portion of said workpiece blank in a direction transverse to said axis to form an electrode welding tip to destroy the co-axial grain structure in said tip and form a nonfibrous isotropic grain structure in said electrode welding tip.

3. The process of claim 2 wherein the electrode blank has a machined conical tip which is cold forged into a blunt truncated welding tip by pressure flowing the tip portion in a direction transverse to the axis of the electrode blank.

4. The process of claim 2 wherein the tip of the electrode blank is truncated.

5. The process of claim 2 wherein the cross-section area of the distal end of the truncated tip portion of the electrode blank is at least doubled by the transverse flow.

6. The process of claim 2 wherein the electrode blank is a cylindrical blank.

* * * * *

UNITED STATES PATENT AND TRADEMARK OFFICE
CERTIFICATE OF CORRECTION

PATENT NO. : 4,045,644
DATED : August 30, 1977
INVENTOR(S) : William M. Shafer; Anil V. Nadkarni It is certified that error appears in the above—identified patent and that said Letters Patent are hereby corrected as shown below:

Column 9, line 9, change "4" to --14--.

Signed and Sealed this

Twentieth Day of December 1977

[SEAL]

Attest:

RUTH C. MASON
Attesting Officer

LUTRELLE F. PARKER
Acting Commissioner of Patents and Trademarks